3,618,155
WINDSCREEN WIPER BLADES
Peter Mower, Whitton, Twickenham, England, assignor to Trico Products Corporation, Buffalo, N.Y.
Filed June 20, 1969, Ser. No. 835,123
Claims priority, application Great Britain, June 21, 1968, 29,700/68
Int. Cl. B60s 1/32
U.S. Cl. 15—250.42                    2 Claims

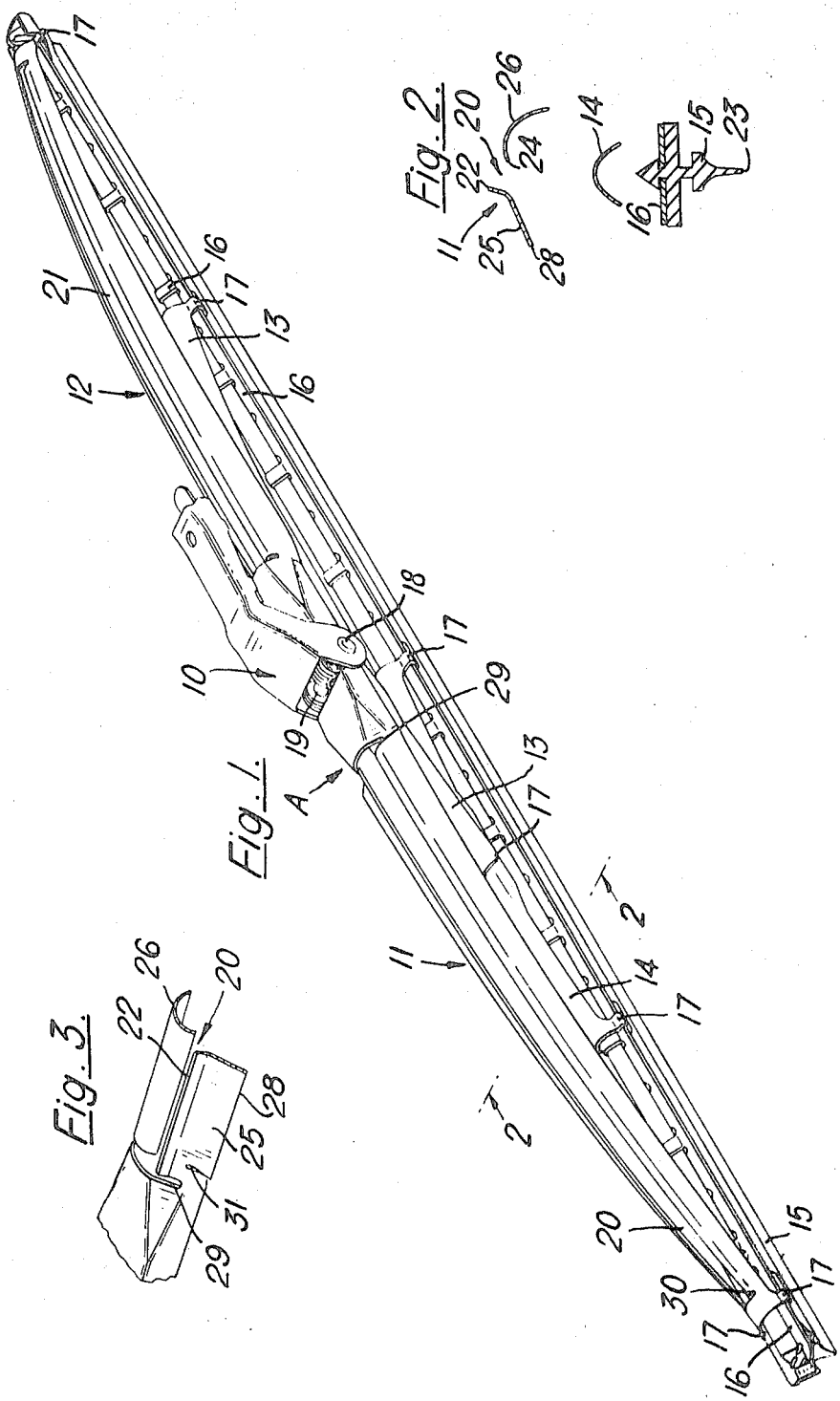

ABSTRACT OF THE DISCLOSURE

A windscreen wiper blade having a longitudinal slot separating the leading portion of the blade harness from the trailing portion. The trailing edge of the leading portion extends outwardly from the blade edge a greater distance than the leading edge of the trailing portion. Thus the airstream flowing over the windscreen is deflected so that a portion of the airstream is directed into a space immediately behind the rubber and turbulence in the area behind the trailing portion of the blade is minimized. This reduces the tendency occurring at high vehicle speeds to lift the blade away from the windscreen.

---

Figure 4:
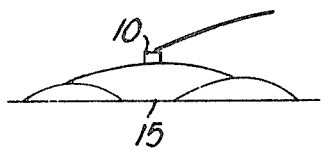

This invention relates to vehicle windscreen wiper blades of the kind comprising a wiping element having a wiping edge, a backing strip for the element, and a harness consisting of a plurality of elongated members which serve to transmit pressure from a wiper arm connection to points spaced along the backing strip.

A windscreen wiper blade is normally pressed into engagement with the windscreen of a vehicle with a predetermined desired pressure by means of a spring associated with a wiper arm which supports the blade in engagement with the windscreen and which is adapted to impart movement to the blade; but when the vehicle is in motion, the blade must usually operate in an airstream set up due to relative movement between the vehicle and the air surrounding it and which tends, particularly at high vehicle speeds, to set up forces on the blade that oppose the pressure of the spring and which may even force the blade away from the windscreen with the result that the action of the wiper blade becomes unsatisfactory. This tendency is at its maximum when the blade is in a position in which it is substantially transverse to the direction of the airstream.

It has hitherto been proposed to overcome this difficulty by constructing and arranging one or more of the elongated members so that the action of the windstream upon it or them tends to assist the action of the spring by increasing the pressure of the blade on the windscreen; but this is not always satisfactory because the airstream usually sets up a high pressure area in front of that side of the rubber of the blade which faces the airstream, i.e., the leading side of the rubber, and a low area behind the trailng side of the rubber, with the result that a portion of the airstream will sometimes force its way between the wiping edge of the rubber and the windscreen, thereby forcing the rubber away from the windscreen and causing unsatisfactory operation of the blade.

According to this invention, in a windscreen wiper blade of the kind referred to, at least part of the harness is asymmetrical in cross section, having a side intended in use to be leading while the other is trailing, in relation to the airstream flowing over the windscreen, and includes means arranged to deflect a portion of the airstream into a space immediately behind the trailing side of the wiping element.

The effect of such an arrangement during the operation of the blade is to increase the air pressure in the space immediately behind the trailing side of the rubber so that the pressure differential is reduced between the areas immediately in front of and immediately behind the rubber, with the result that the tendency of a portion of the airstream to force a way between the rubber and the windscreen is also reduced.

According to a feature of the invention at least one of the elongated members has a longitudinal slot, separating a leading portion of the member from a trailing portion, and the trailing edge of the leading portion is arranged so that it is further away from the wiping edge than is the leading edge of the trailing portion.

The principal object of the present invention is to provide an improved blade harness which acts upon the airstream across the windscreen so as to reduce the tendency of the airstream to lift the blade off the windscreen, thereby improving the wiping characteristics of the blade.

Other objects and advantages of the invention will be apparent from the following detailed description taken in connection with the accompanying drawings.

Figure 5:
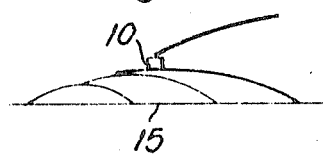
Figure 6:
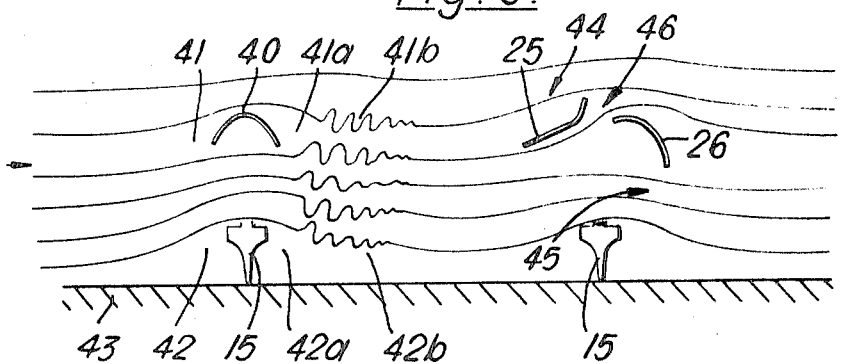

Examples of windscreen wiper blades according to the invention will now be described with reference to the accompanying drawings in which:

FIG. 1 is a perspective view of a blade according to the invention;
FIG. 2 is a section on the line 2—2 of FIG. 1;
FIG. 3 is an enlarged view of the region A of FIG. 1;
FIGS. 4 and 5 show blades having other arrangements of elongated members; and
FIG. 6 shows diagrammatically airflow past a conventional elongated member and a member according to the invention.

The vehicle windscreen wiper blade shown in FIG. 1 includes a clip 10 which is in use connected to one end of a wiper arm (not shown) which is oscillated by a suitable motor in known manner. Elongated members 11, 12, 13, 14 are adapted to transmit pressure from the clip 10 to a wiping element or rubber, 15, provided with a metal backing strip 16.

The members 11, 12 are levers having claws 17 at their outer ends which embrace the sides of the backing strip 16, and at their inner ends are pivoted on a pin 18 passing through flat portions at the inner ends of the sdes of the members 11, 12. A coil spring 19 surrounds the pin and its ends bear on the members 11, 12 to urge the claws 17 towards the windscreen of a vehicle when the blade is mounted on its wiper arm on the vehicle.

The member 14 is a yoke having claws 17 at its ends embracing the strip 16; the member 13 is a yoke having claws 17 at its ends, the claws at one end embracing the strip 16 and at the other end embracing the sides of the member 14 at its mid-point. The pin 18 passes through the sides of the member 13 between its ends so that the member 13 is pivoted on the pin 18.

The members 11 and 12 are formed of sheet material, with longitudinal slots 20 and 21, respectively. Each slot is shown in FIG. 1 as extending along the greater part of the length of its member, but in other embodiments of the invention either shorter slots or somewhat longer slots can be formed in the members. The slot 20 separates a leading portion 25 from a trailing portion 26, as shown in FIG. 2. The cross section of the member is asymmetrical; the trailing edge 22 of the leading portion 25 is further from the wiping edge 23 of the rubber 15 than is the leading edge 24 of the trailing portion 26. In a similar manner, the member 12 is formed with the slot 21 and arranged so that the trailing edge of its leading portion is further away from the wiping edge of the rubber than is the leading edge of the trailing portion of the member 12.

The portions 25 and 26 of the member 11 and the corresponding leading and trailing portions of the member 12 may be either straight as seen in cross section, or curved as shown in FIG. 2; and they are suitably orientated both in relationship to each other and to the rubber 15 such that, when in operation, the airstream referred to hereinbefore can flow over and through the blade with a portion thereof deflected by the trailing portion 26 into the space immediately behind the rubber 15 so as to increase the air pressure in that space and thereby minimise turbulence in the area behind the trailing portion of the blade. This action is described more fully below with reference to FIG. 6.

In the blade shown in FIG. 1 the members 11 and 12 are provided with transverse slits 29 and 30 at the ends of the slots and also with transverse slits 31 (see FIG. 3) that allow the orientation and the curvature of the leading and trailing portions to be adjusted, but once the optimum position and degree of curvature for each of the portions has been found for a particular set of conditions, the slits may be omitted in subsequent repeated manufacture, if desired.

Only one, or more than two, or all, the pressure transmitting members could be slotted and shaped in the manner of the members 11, 12.

The invention is applicable to blades having a different number or arrangement of pressure transmitting members in the harness for the rubber, for example the arrangements shown diagrammatically in FIGS. 4 and 5.

The connection for mounting a blade on its wiper arm may be of any suitable kind. In the embodiment of the invention shown in FIG. 1 the connection 10 comprises a known form of clip fastener that is pivotally mounted on the pivot pin 18 and provided with an opening at its end remote from the pin 18 into which the end of a suitable wiper arm is adapted to be inserted so that it becomes fastened to the blade.

The free end of the clip 10 is shown in FIG. 1 to be pointing towards the right hand end of the blade, but, bearing in mind that a blade in accordance with this invention, to be effective, must be mounted on an arm provided for it on a vehicle so that the leading portions of the members 11 and 12 will face the airstream, it will be desirable to provide other blades according to the invention having clips that point towards the left hand end of the blade, as seen in FIG. 1, so that a blade with the appropriately directed clip for any particular arm can then be selected.

As shown in FIG. 6, a conventional pressure-transmitting member having an uninterrupted surface, e.g. a surface 40, causes a disturbance to the airstream which results in a high pressure area 41 in front of the member, and a low pressure area 41a immediately behind the member, and a turbulence 41b following the member 40 which can extend for some considerable distance. This turbulence is caused by a general flow into the low pressure area following the member. There is also a high pressure space 42 and a low pressure space 42a and a turbulence 42b associated with the rubber 15. With a blade according to the present invention, a portion of the airstream is deflected by the trailing portions 26 of the members 11 and 12 into the low pressure space 42a immediately behind the rubber 15 with the result that the pressure differential between this space and the high pressure space 42 in front of the rubber 15 is reduced, and the lines of airflow are more nearly the same as if no member were present, i.e. parallel to the windscreen 43. Some turbulence may still occur behind the blade, but it will be much reduced, and the reduction in the said pressure differential reduces the risk of air forcing its way between the rubber and the windscreen.

In the embodiment of the invention shown in FIGS. 2 and 6 the member 11 is formed of sheet material, e.g. metal, and its leading and trailing sides 25 and 26 are curved and orientated in the manner shown. Referring to this arrangement in detail, the leading portion 25 is convex towards the rubber 15 and it slopes upwards, i.e. away from the wiping edge, from its leading edge 28 to its trailing edge, whereas the trailing portion 26 is concave towards the rubber and, as shown in FIGS. 2 and 6, it slopes downwards from its leading edge 24 to its trailing edge with the leading edge 24 lying below and somewhat to the rear of the trailing edge 22 of the leading portion 25.

The leading portion 25 directs a part 44 of the airstream upwards over the member 11, a part 46 of the airstream passes through the slot 20 in the member in a slightly upward direction, and a part 45 of the airstream is directed by the trailing portion 26 of the member 11 downwards into the low pressure area behind the rubber 15.

The slits 29, 30 and 31 formed in the portions 25 and 26 of the member 11 and corresponding slits in the portions of the member 12 permit both the curvature and the orientation of the sides of the members 11 and 12 to be adjusted with a view to producing an optimum arrangement such that turbulence caused by the flow of air over and through the wiper blade during its operation, the drag of the blade as it oscillates to and fro across the windscreen, and the forces applied by the airstream to the blade which tend to force the blade either towards or away from the windscreen, are reduced to minimum values. As mentioned hereinbefore, once the optimum arrangement for a particular kind of blade has been established other blades can be manufactured similarly arranged to said blade but with the slits 29 and 31 omitted.

A certain specific embodiment of the invention has been described for the purpose of illustration but it will be apparent that various modifications and other embodiments are possible within the scope of the invention. For example, the member 11 and/or the member 12 may be replaced by a bifurcated member, the slot of which is open at the end of the member—that is the end which is pivotally mounted on the pin 18 and the member 11 and/or member 12 may be replaced by two separate members forming the leading and trailing portion respectively. It is to be understood therefore that the invention is not limited to the specific arrangement shown but in its broadest aspects it includes all equivalent embodiments and modifications which come within the scope of the invention.

I claim:

1. A windscreen wiper blade comprising a wiping element having a wiping edge, a backing strip for the element, and a harness consisting of a plurality of elongated members which serve to transmit pressure from a wiper arm connection to points spaced along the backing strip, at least part of the harness being asymmetrical in cross section, said asymmetrical part having a leading side and a trailing side extending longitudinally of the blade in relation to the airstream flowing over the windscreen, said leading and trailing sides being spaced apart to form a longitudinally extending slot therebetween, the leading side being upwardly sloped away from the wiping edge from its leading edge toward its trailing edge, the trailing side being downwardly sloped from its leading edge to its trailing edge, the leading edge of the trailing side lying below and rearwardly of the trailing edge of the leading side thereby being arranged to direct a portion of the airstream through said longitudinally extending slot and to deflect another portion thereof into a space immediately behind the trailing side of said wiping element whereby to increase the air pressure in the space immediately behind the wiping edge of the wiping element.

2. A blade according to claim 1 in which said leading side in cross section is convex towards the wiping element, while the trailing side thereof is concave towards the wiping element.

References Cited

UNITED STATES PATENTS

| | | | |
|---|---|---|---|
| 2,814,820 | 12/1957 | Elliott et al. | 15—250.42 X |
| 2,937,393 | 5/1960 | Brueder | 15—250.42 |
| 3,037,233 | 6/1962 | Peras et al. | 15—250.42 |
| 3,317,946 | 5/1967 | Anderson | 15—250.42 |

FOREIGN PATENTS

| | | | |
|---|---|---|---|
| 964,139 | 7/1964 | Great Britain | 15—250.42 |
| 1,144,822 | 3/1969 | Great Britain | 15—250.42 |

HENRY C. SUTHERLAND, Primary Examiner

S. D. BURKE, Assistant Examiner